United States Patent
Call et al.

(10) Patent No.: US 12,058,170 B2
(45) Date of Patent: *Aug. 6, 2024

(54) CODE MODIFICATION FOR DETECTING ABNORMAL ACTIVITY

(71) Applicant: Shape Security, Inc., Seattle, WA (US)

(72) Inventors: Justin D Call, Santa Clara, CA (US); Xiaoming Zhou, Sunnyvale, GA (US); Xiaohan Huang, Cupertino, CA (US); Subramanian Varadarajan, San Jose, CA (US); Roger S. Hoover, Granite Canon, WY (US)

(73) Assignee: Shape Security, Inc., Seattle, WA (US)

( * ) Notice: Subject to any disclaimer, the term of this patent is extended or adjusted under 35 U.S.C. 154(b) by 330 days.

This patent is subject to a terminal disclaimer.

(21) Appl. No.: 17/680,977

(22) Filed: Feb. 25, 2022

(65) Prior Publication Data

US 2023/0273990 A1    Aug. 31, 2023

Related U.S. Application Data

(63) Continuation of application No. 16/729,395, filed on Dec. 29, 2019, now Pat. No. 11,297,097, which is a
(Continued)

(51) Int. Cl.
*H04L 9/40* (2022.01)
*G06F 21/54* (2013.01)
(Continued)

(52) U.S. Cl.
CPC .......... *H04L 63/1441* (2013.01); *G06F 21/54* (2013.01); *G06F 21/566* (2013.01);
(Continued)

(58) Field of Classification Search
CPC ........ G06F 21/52; G06F 21/54; G06F 21/554; G06F 21/56; G06F 21/566; G06F 21/577;
(Continued)

(56) References Cited

U.S. PATENT DOCUMENTS

2008/0222736 A1 * 9/2008 Boodaei ................ G06F 21/128
726/27
2012/0159193 A1 * 6/2012 Spradlin ................ G06F 21/79
713/190

FOREIGN PATENT DOCUMENTS

WO     WO-2013091709 A1 *  6/2013  ............. G06F 21/14

* cited by examiner

*Primary Examiner* — Kevin Bechtel
(74) *Attorney, Agent, or Firm* — Troutman Pepper Hamilton Sanders LLP (F5 PATENTS)

(57) ABSTRACT

Techniques for code modification for detecting abnormal activity are described. Web code is obtained. Modified web code is generated by changing a particular programmatic element to a modified programmatic element throughout the web code. Instrumentation code is generated configured to monitor and report on one or more interactions with versions of the particular programmatic element. The instrumentation code is caused to be provided in association with the modified web code to the first client device in response to the first request from the first client device. Report data generated by the instrumentation code is received. The report data describes abnormal activity at the first client device, the abnormal activity comprising an interaction with a version of the particular programmatic element that does not exist in the modified web code. Based on the report, it is determined that the first client device is likely controlled by malware.

20 Claims, 6 Drawing Sheets

Related U.S. Application Data continuation of application No. 15/925,748, filed on Mar. 19, 2018, now Pat. No. 10,536,479, which is a continuation of application No. 14/822,287, filed on Aug. 10, 2015, now Pat. No. 9,923,919, which is a continuation of application No. 14/055,704, filed on Oct. 16, 2013, now abandoned.

(60) Provisional application No. 61/800,907, filed on Mar. 15, 2013.

(51) Int. Cl.
*G06F 21/56* (2013.01)
*H04L 67/02* (2022.01)

(52) U.S. Cl.
CPC ........ *H04L 63/1416* (2013.01); *H04L 63/168* (2013.01); *H04L 67/02* (2013.01); *H04L 2463/144* (2013.01)

(58) Field of Classification Search
CPC ........... G06F 2221/034; H04L 63/1416; H04L 63/1441; H04L 63/168; H04L 2463/144
See application file for complete search history.

CODE MODIFICATION FOR DETECTING ABNORMAL ACTIVITY

This application is a continuation of U.S. patent application Ser. No. 16/729,395, filed Dec. 29, 2019, which is a continuation of U.S. patent application Ser. No. 15/925,748, filed on Mar. 19, 2018 (now U.S. Pat. No. 10,536,479, issued Jan. 14, 2020), which is a continuation of U.S. patent application Ser. No. 14/822,287, filed on Aug. 10, 2015 (now U.S. Pat. No. 9,923,919, issued Mar. 20, 2018), which is a continuation of U.S. patent application Ser. No. 14/055,704, filed on Oct. 16, 2013, which claims the benefit of U.S. Provisional Application Ser. No. 61/800,907, filed on Mar. 15, 2013, the entire contents of which are hereby incorporated by reference as if fully set forth herein.

FIELD

This document generally relates to computer security that involves modifying content served to client computers so as to prevent malicious activity by those computers.

BACKGROUND

Computer fraud is big business both for the fraudsters and the people who try to stop them. One common area of computer fraud involves attempts by organizations to infiltrate computers of ordinary people, and by that action to trick those people into giving up confidential information, such as credit card information and access codes. For example, via an exploit commonly termed "Man in the Browser," a user's computer can be provided with code that intercepts legitimate communications by the user, such as with the user's bank, and does so after the communications have been decrypted, e.g., by a web browser on the computer. Such code may alter the interface that the user sees, such as by generating an interface that looks to the user like their bank is requesting particular information (e.g., a PIN number) when in fact the bank would never request such information via a web page. Alternatively, the code may generate an interface that indicates to a user that a banking or shopping transaction was executed as the user requested, when in fact, the illegal organization altered the transaction so as to send the user's money to an entity associated with the organization.

Various approaches have been taken to identify and prevent such malicious activity. For example, programs have been developed for operation on client computers or at the servers of the organizations that own and operate the client computer to detect improper activity.

SUMMARY

The appended claims may serve as a summary of the invention.

BRIEF DESCRIPTION OF THE DRAWINGS

In the drawings.

Like reference numbers and designations in the various drawings indicate like elements.

Figure 1A:
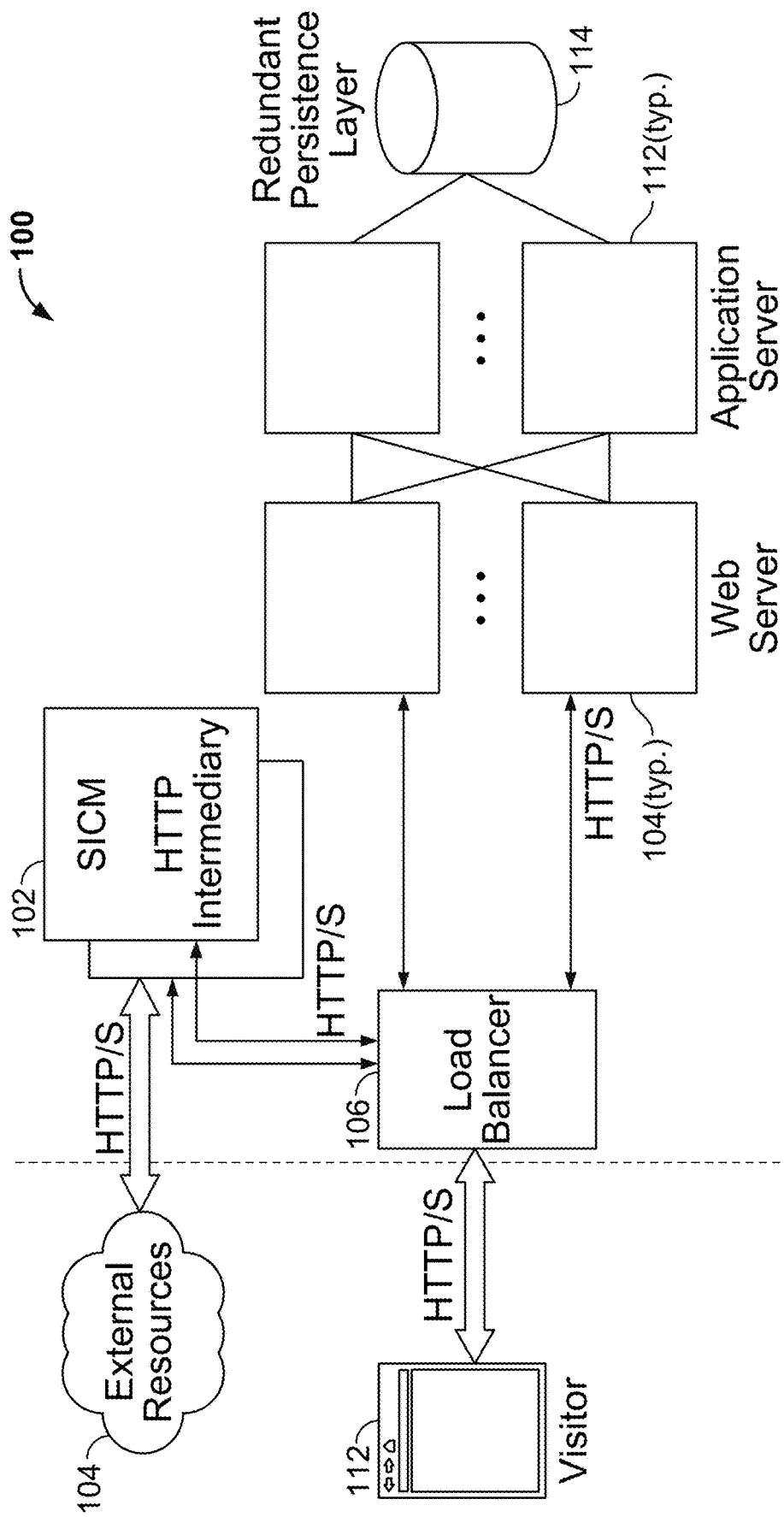
FIGS. 1A to 1C depict different schematic views of a system for re-coding web content served to client computers that request the content.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

This document describes systems and techniques by which web code (e.g., HTML, CSS, and JavaScript) is modified before it is served over the internet by a server system so as to make more difficult the exploitation of the server system by clients that receive the code (including clients that are infected without their users' knowledge). The modifications may differ for different times that a web page and related content are served, whether to the same client computer or to different client computers. Specifically, two different users (or a single user in two different web browsing sessions) may be served slightly different code in response to the same requests, where the difference may be in implicit parts of the code that are not displayed so that the differences are not noticeable to the user or users. For example, the names that are served to a client device for various software objects may be changed in essentially random ways each time a page is served. A main purpose of such action is to create a moving target with the code, so that malicious code cannot use predictability of the code in order to interact with the content in a malicious way. In one example, changing the code served to client devices in an essentially random manner each time the code is served can deter malicious code executing on the client computers (e.g., Man in the Browser bot) from interacting with the served code in a predictable way so as to trick a user of the client computer into providing confidential financial information and the like. Moreover, external programs generally cannot drive web application functionality directly, and so preventing predictable interaction with served code can be an effective means of preventing malicious computer activity.

In general, creating a moving, unpredictable target by modifying aspects of web code each time it is served can prevent or deter a wide variety of computer attacks. For example, such techniques can be used to combat credential stuffing, in which malicious parties obtain leaked or cracked user credentials for a given web service and then use automated bots to perform credential testing at other websites or services based on the illicitly obtained credentials. By changing the content and structure of the web code each time it served, bots that seek to either listen for user credentials or to perform automated credential testing may be thwarted by random changes in the web code that significantly complicate the bot's task of determining how to effectively interact with the web code.

Likewise, other forms of computer attacks can also be prevented or deterred by the web code transformations described in this document. Some of these attacks include: (a) denial of service attacks, and particularly advanced application denial of service attacks, where a malicious party targets a particular functionality of a website (e.g., a widget or other web application) and floods the server with requests for that functionality until the server can no longer respond to requests from legitimate users;

(b) rating manipulation schemes in which fraudulent parties use automated scripts to generate a large number of positive or negative reviews of some entity such as a marketed product or business in order to artificially skew the average rating for the entity up or down;

(c) fake account creation in which malicious parties use automated scripts to establish and use fake accounts on one or more web services to engage in attacks ranging from content spam, e-mail spam, identity theft, phishing, ratings manipulation, fraudulent reviews, and countless others;

(d) fraudulent reservation of rival goods, where a malicious party exploits flaws in a merchant's website to engage in a form of online scalping by purchasing all or a substantial amount of the merchant's inventory and quickly turning around to sell the inventory at a significant markup;

(e) ballot stuffing, where automated bots are used to register a large number of fraudulent poll responses;

(f) website scraping, where both malicious parties and others (e.g., commercial competitors), use automated programs to obtain and collect data such as user reviews, articles, or technical information published by a website, and where the scraped data is used for commercial purposes that may threaten to undercut the origin website's investment in the scraped content;

and (g) web vulnerability assessments in which malicious parties scan any number of websites for security vulnerabilities by analyzing the web code and structure of each site.

The systems, methods, and techniques for web code modifications described in this paper can prevent or deter each of these types of attacks. For example, by randomizing the implicit references in web code that may be used for making requests to a web server or by randomly injecting distractor fields into the code that were not originally part of the code provided by the web server, the effectiveness of bots and other malicious automated scripts is substantially diminished.

As such, malicious activity can be both deflected and detected in relatively sophisticated manners by changing the environment in which executable code on the client device, such as JavaScript, operates (in addition to changing corresponding references in the HTML code). Deflection occurs by the constant changing of code elements as they are served each time, such as changing the names of elements that will be called by malicious JavaScript, so that the malicious code can never catch up with the changes, and thus gives itself away when it tries to interoperate with code known by the system to be stale. Detection can occur by identifying certain JavaScript operations or calls that may be made on a page, and instrumenting code that is served with a web page so as to report to a security server system when such operations occur and/or such calls are made (along with information that describes the actions). Specifically, malicious code may try to call an item that it believes to be part of a static page, where that item is not part of the dynamically altered code that was actually served, and such a false call can be detected and reported.

As one example, a common method for making changes to a document object model (DOM) for a web page is the document write method, and may be used by malicious code to surreptitiously change what the user of a computing device sees on a web page. A security system can (1) instrument served code corresponding to such a method so that the instrumentation code reports calls to the method, and additional includes data that characterizes such calls, so that the system can detect abnormal activity and perhaps use the additional data to determine whether the abnormal activity is malicious or benign;

and (2) change the function name to "document.#3@1*87%5.write," "1@2234$56%.4$4$345%4.@ 12111 @", or some other legal name that includes random text that can be changed automatically each time the code is served. Such constant changing creates a real challenge for a malicious party seeking to write code that can keep up with the changes, and also flags the presence examples of JavaScript actions that can be instrumeand continually changed include "getElementById," "getElementByName,") (Path commands, and setting of HTML elements in the DOM to particular values.

The modification of code that is described in more detail below may be carried out by a security system that may supplement a web server system, and may intercept requests from client computers to the web server system and intercept responses from web servers of the system when they serve content back to the client computers (including where pieces of the content are served by different server systems). The modification may be of static code (e.g., HTML) and of related executable code (e.g., JavaScript) in combination. For example, the names of certain elements on a web page defined via HTML may be changed, as may references to items external to the HTML (e.g., CSS and JavaScript code). For example, the name of a label may be changed from a name provided by a programmer to an essentially random name like $4@376&8*. Such renaming may occur by first identifying programmatically related elements across the different types of code that are to be served to the client computer (e.g., HTML, CSS, and JavaScript) and grouping such occurrences of elements for further processing (e.g., by generating flags that point to each such element or copying a portion of each such element). Such processing may occur by modifying each element throughout the different formats of code, such as changing a name in the manner above each time that name occurs in a parameter, method call, DOM operation, or elsewhere. The modified elements may then be placed into the code to be delivered to the client computer, by recoding the code that was sent from the web server system, and serving the recoded code. Such a process may be repeated each time a client computer requests code, and the modifications may be different for each serving of the same code.

Such modification of the served code can help to prevent bots or other malicious code from exploiting or even detecting weaknesses in the web server system. For example, the names of functions or variables may be changed in various random manners each time a server system serves the code. As noted above, such constantly changing modifications may interfere with the ability of malicious parties to identify how the server system operates and web pages are structured, so that the malicious party cannot generate code to automatically exploit that structure in dishonest manners. In referring to random modification, this document refers to changes between different sessions or page loads that prevent someone at an end terminal or controlling an end terminal to identify a pattern in the server-generated activity. For example, a reversible function may change the names when serving the code, and may interpret any HTTP requests received back from a client by changing the names in an opposite direction (so that the responses can be interpreted properly by the web servers even though the responses are submitted by the clients with labels that are different than those that the web servers originally used in the code). Such techniques may create a moving target that can prevent malicious organizations from reverse-engineering the operation of a web site so as to build automated bots that can interact with the web site, and potentially carry out Man-in-the-Browser and other Man-in-the-Middle operations and attacks.

In addition to preventing malicious code from operating properly, the systems discussed here can also identify malicious operation. For example, in addition to or as an alternative to being randomly modified so as to prevent interoperation at network endpoints by malicious code, the web server code may be supplemented with instrumentation code that is programmed to identify alien content in the rendered web page on the client computer. That instrumentation code that runs on the client may, for example, be programmed to identify a function call for a function name that does not match function calls that are permissible for a particular served web page (e.g., where the alien call may be one that matches a name from the page originally provided by a web server but does not match the revised name generated by the code alteration techniques discussed in the prior paragraph). Such alien content may simply be an indication that the user has installed a legitimate plug-in to his or her browser, or it may also be an indication that the user's computer has become infected with malicious code (e.g., JavaScript code). Additional techniques may be used once alien content is identified so as to determine whether the content is malicious or benign.

The techniques discussed here may be carried out by a server subsystem that acts as an adjunct to a web server system that is commonly employed by a provider of web content. For example, as discussed in more detail below, an internet retailer may have an existing system by which it presents a web storefront at a web site (e.g., www.example-store.com), interacts with customers to show them information about items available for purchase through the storefront, and processes order and payment information through that same storefront. The techniques discussed here may be carried out by the retailer adding a separate server subsystem (either physical or virtualized) that stands between the prior system and the internet. The new subsystem may act to receive web code from the web servers (or from a traffic management system that receives the code from the web servers), may translate that code in random manners before serving it to clients, may receive responses from clients and translate them in the opposite direction, and then provide that information to the web servers using the original names and other data. In addition, such a system may provide the retailer or a third party with whom the retailer contracts (e.g., a web security company that monitors data from many different clients and helps them identify suspect or malicious activity) with information that identifies suspicious transactions. For example, the security subsystem may keep a log of abnormal interactions, may refer particular interactions to a human administrator for later analysis or for real-time intervention, may cause a financial system to act as if a transaction occurred (so as to fool code operating on a client computer) but to stop such a transaction, or any number of other techniques that may be used to deal with attempted fraudulent transactions.

In one implementation, a computer-implemented method for deflecting abnormal computer interactions is disclosed. The method comprises receiving, at a computer server system and from a client computer device that is remote from the computer server system, a request for web content; identifying, by computer analysis of mark-up code content that is responsive to the request, executable code that is separate from, but programmatically related to, the mark-up code content; generating groups of elements in the mark-up code content and the related executable code by determining that the elements within particular groups are programmatically related to each other; modifying elements within particular ones of the groups consistently so as to prevent third-party code written to interoperate with the elements from modifying from interoperating with the modified elements, while maintain an ability of the modified elements within each group to interoperate with each other; and recoding the mark-up code content and the executable code to include the modified elements. The method can also include serving the recoded mark-up code content and executable code to the client computer device. Moreover, the method can comprise performing the steps of receiving, identifying, generating, modifying, and recoding repeatedly for each of multiple different requests from different client computers, wherein the elements within particular ones of the groups are modified in different manners for each of the requests. The method can also comprise generating instrumentation code configured to monitor interaction with the recoded mark-up code, executable code, or both, and to report to the computer server system information that identifies abnormalities in the interaction. In addition, the method may comprise receiving, at the computer server system and from the instrumentation code executing on the client computing device, a report of activity by alien code attempting to interoperate with the recoded mark-up code, executable code, or both.

In some aspects, the attempt to interoperate comprises an attempt to alter a document object model for a web browser on the client computer Also, generating the group of elements can comprise identifying elements that address or are addressed by a common name, and the common name can be a common name of an element, method, function, or object. Modifying the elements can comprise changing the common name in a consistent manner across the elements, and changing the common name can comprise changing the common name to a random string of characters. In addition, mark-up code can comprise HTML code and the executable code can comprise JavaScript code. The method can also include modifying elements in cascading style sheet (CSS) code identified as being programmatically related to the HTML code.

In another implementation, a computer system for recoding web content served to client computers is disclosed. The system can include a web server system configured to provide computer code in multiple different formats in response to requests from client computing devices; and a security intermediary that is arranged to (i) receive the computer code from the web server before the resource is provided to the client computing devices, (ii) identify common elements in the different formats of the computer code by determining that the common elements interoperate with each other when the code is executed;

(iii) modify the common elements in a consistent manner across the different formats of the computer code; and (iv) recode the computer code using the modified common elements. The system can be further configured to serve the recoded computer code to particular client computing devices that requested the code. Also, the security intermediary can be programmed to perform actions (i) through (iv) in response to each request for content, and to modify the common elements in different manners for different requests for the same computer code. The system may additionally include an instrumentation module programmed to generate instrumentation code configured to monitor interaction with the recoded mark-up code, executable code, or both, and to report to the computer server system information that identifies abnormalities in the interaction. The system can include a computer interface configured to receive resources from a web server that has been served in the form of computer code to client computing devices in response to requests from the client computing devices.

Other features and advantages will be apparent from the description and drawings, and from the claims.

DETAILED DESCRIPTION

Figure 1B:
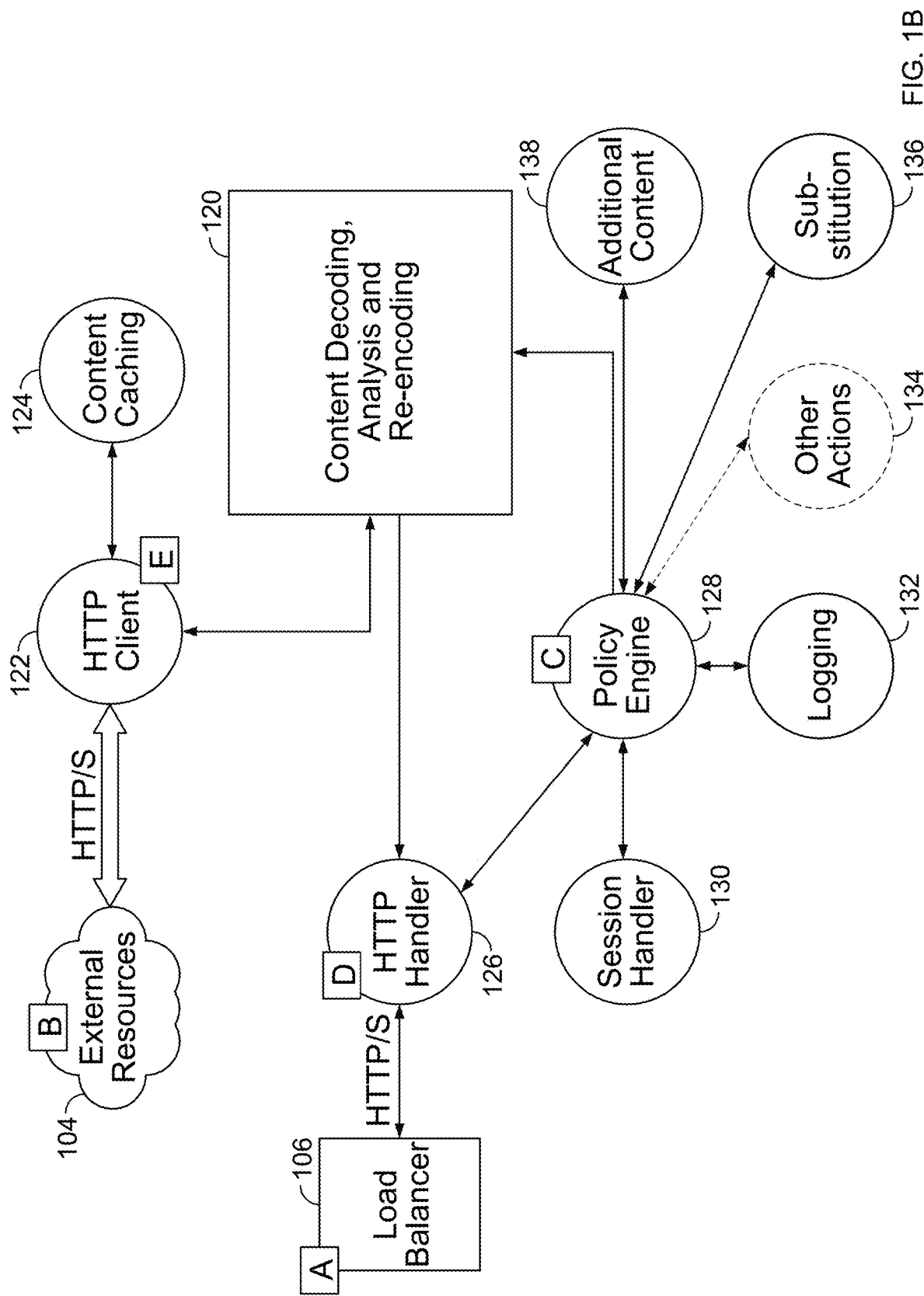
Figure 1C:
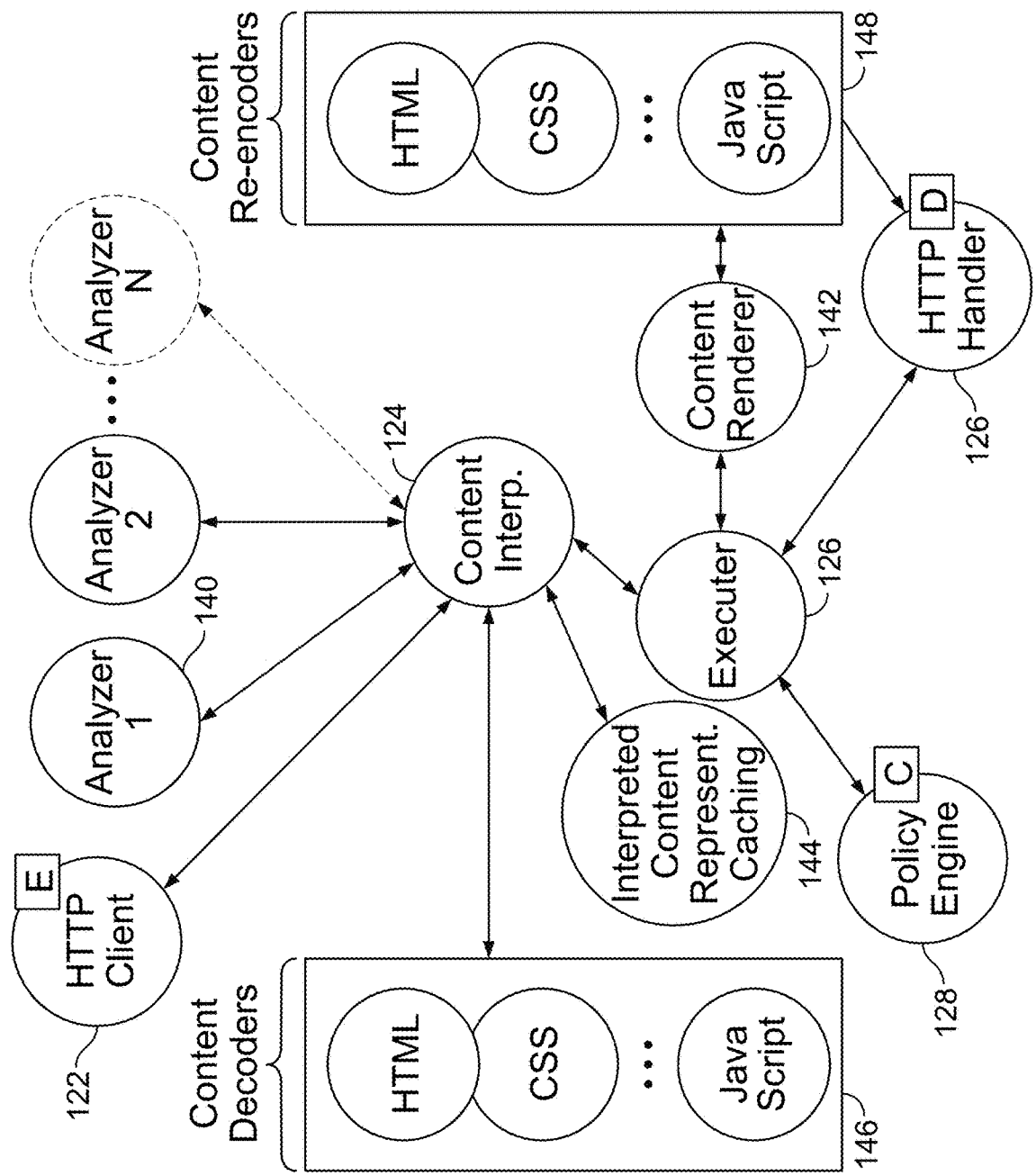

FIGS. 1A to 1C depict different schematic views of a system 100 for re-coding web content served to client computers that request the content. Web content may include, for example, HTML, CSS, JavaScript, and other program code associated with the content or transmission of web resources such as a web page that may be presented at a client computer 112 (or many different requesting client computers). The system 100 can detect and obstruct attempts by fraudsters and computer hackers to learn the structure of a website and exploit security vulnerabilities in the client computer 112. For example, malware may infect a client computer 112 and gather sensitive information about a user of the computer, discreetly modify an online transaction, or deceive a user into engaging in compromising activity such as divulging confidential information. Man-in-the-middle exploits are performed by one type of malware that is difficult to detect on a client computer 112, but can use security vulnerabilities at the client to engage in such malicious activity.

Referring to a general system overview in FIG. 1A, the system 100 can serve modified and instrumented web code to the client computer 112 to detect and obstruct malware attempts to discern and exploit operations of a web server system 104. The web server system 104 may take a number of forms, and the web server system 104 may include application servers 112 and a redundant persistence layer 114, among many other common components needed for a full web-service implementations. The web server system 104 may be operated, for example, to provide an on-line retail or banking presence.

The service of the modified and instrumented code can take a variety of forms, including by a web browser on the client computer 112 rendering a page and potentially accessing additional code (e.g., JavaScript or code from other domains) based on code that is part of the web page, and the browser may build a document object model (DOM) in a familiar manner by such rendering and execution of the provided code.

The system 100 can include a security intermediary 102 that is logically located between the web server system 104 and one or more client devices 114. The security intermediary 102 can receive a portion or all of the traffic, including web code, transmitted between the various client devices 112 and the web server system 104 (and vice-versa). In compliance with a governing security policy, when the web server system 104 provides a resource such as a web page in response to a client computer 112 request, the web server system 104 can forward the response to the security intermediary 102 (perhaps through a load balancer 106 or other data management devices or applications) so that the web code for the response can be modified and also supplemented with instrumentation code. Modification of the web code may be random in certain manners, and can differ each time a response is served to a client to prevent malware from learning the structure or operation of the web server, or from being developed by a malicious organization that learns the structure or operation. Additionally, the web code can be supplemented with instrumentation code that is executable on the client computer 112. The instrumentation code may detect when abnormal behavior occurs on the client computer 112, such as possible unauthorized activity by the malware, and can report the occurrence of such activity to the security intermediary 102.

When security intermediary 102 receives requests (e.g., HTTP requests) from clients in response to previously-served modified web code being processed on those clients, it can apply reverse modifications to the requests before forwarding the requests to the web server system 104. Additionally, the security intermediary 102 can receive reports from the instrumentation code that indicate abnormal behavior on the client computer 112, and the security intermediary 102 can log these events, alert the web server system 104 to possible malicious activity, and send reports about such events to a central security server (not shown). The central security server may, in some implementations, analyze reports in the aggregate from multiple security intermediaries 102, and/or reports from multiple client devices 114 and multiple computing sessions and page loads. In performing such activities, the security intermediary may rely on external resources 104, such as when the security intermediary 102 is located at a customer premise or data center, and the resources are available from a central security provider, such as a company that supplied the security intermediary 102 to the customer FIG. 1B is a schematic diagram of the system 100 depicted in FIG. 1A, but showing in more detail structures that carry out actions for re-coding, across multiple different formats (e.g., HTML, CSS, and Javascript) and in a consistent manner as between the formats so that the re-coded code will execute properly, code that is served by the system 100. Such different formats might be embedded in the original HTML document or loaded from separate HTTP transactions, and the system 100 ensures that each of the separate components is recoded consistently in an inline manner with the service of content in response to a user request for the content (e.g., a page for ordering a product from a store and for paying for the product using a credit card).

Referring now to particular components of the system, a content decoding, analyzing and re-encoding module 120 sits at the middle of the system and may be adjust to or implement the structures identified in the circle shown to interact with the content decoding, analyzing and re-encoding module 120. The content decoding, analyzing and re-encoding module 120 may receive a request aimed at a web server system (e.g., system 104 in FIG. 1A) via a load balancer 106 for the web server system. An HTTP handler may initially receive the request in order to analyze and parse it. In certain instances, the HTTP handler can issue an error if the request is not of a form that can be handled by the web server system, for example. Once the request is decoded, an internal representation of the request is provided to the policy engine 128. The policy engine 128 first evaluates the HTTP request based on header and network information. If the request corresponds to a specific policy that is implemented by the policy engine 128, session information and appropriate actions are associated with the policy and information about the policy is associated in the system 100 with the HTTP request. The logical request is then passed back to the HTTP handler 126 so that it can forward the request to the web server via load balancer 106. If, based on the identified network and header information, no policy applies, the request is forwarded, but the process does not associate any session or policy information with the request within the system.

Referring now to FIG. 1B in combination with FIG. 1C, which shows in more detail components used for modifying content to be served, once the original web server fulfills the request, the response (e.g., in the form of HTML code and other related code or pointers to related code on other server systems) is passed along with the stored policy information to the policy engine 128. This may be referred to as a logical HTTP transaction. The entire HTTP response need not be parsed or even fully read at this time, in the particular implementation. The policy engine 128 forwards the specific policy and the logical HTTP transaction to the executer 126 within the content decoding, analysis and re-encoding subsystem 120.

The next stage of policy application has to do with matching content to actions. Content may be identified within a DOM for the content to be served using XPATH, regular expressions, or by other means. Actions include substitutions, the addition of content and other actions that may be provided as extensions to the system. These operations are represented by the Substitution 136, Additional Content 138, and Other Actions 134 subsystems in FIG. 1B, which may each be implemented as data stores and associated logic for identifying actions to be taken with code to be served in order to re-code the content. In this example implementation, these policy elements can only be evaluated and conditionally applied once the actual web content is decoded.

Once a policy and a logical HTTP transaction are received by the executor 126, the HTTP response and the portion of the policy that identifies content to be acted upon are forwarded to a content interpreter 124 (FIG. 1C). The content interpreter 124 uses content decoders 146 to convert the HTTP response into a suitable internal representation. During the decoding process, policy identified content is located. If no policy-identified content is located, the executer 126 notifies the policy engine 128 that the policy was evaluated but not applied. Where there is no applicable policy, the original HTTP response is transmitted unmodified to the client computer via the HTTP Handler 126.

If the decoding process identifies the need to resolve external references, those references are resolved by the HTTP client 122. External references include script or style tags within HTML content that reference content to be delivered as part of another HTTP request. If the content is static and reported as not modified, the content interpreter 124 will attempt to locate previously processed and analyzed versions of content within an interpreted content representation cache 124, 144.

Once the response from within a logical HTTP transaction has been assembled, with external references resolved, the content is analyzed. The process of analysis is informed by the possible actions to be performed. Adding additional content (e.g., instrumentation code) only requires understanding what content is already present and how it is identified. Changing content requires understanding what content is present, how it is identified, and how it is referenced within other related content. For example, if the purpose of content modification is to change the name of a form field, it may be necessary to understand if the form field is referenced by CSS for presentation purposes or referenced by JavaScript for validation.

Multiple analyzers 140 are used to perform the various types of analysis required and also to attempt different parallel or sequential analysis strategies. For example, to recognize whether or not a script written in JavaScript contains a reference to an HTML element, unfolding constants and in-lining functions may be sufficient in many cases to produce a determination about whether or not a reference occurs. In other cases, a more detailed analysis will need to be performed. Such analysis may need to unroll loops and perform other techniques to make a decision.

To ensure that the analysis completes, the system 200 imposes limits on the level of analysis that will be performed. Limits may be based on complexity or on clock time, or other appropriate measure. Complexity limits may consist of how deep to examine the various syntax trees that are created during the decoding phase or how many iterations of loops that are encountered should be unrolled. Time-based limits impose soft real time limits on the computing time to perform analysis. Time-based limits may allow subsequent requests involving identical content to succeed where initial requests failed as some analysis results may be cached.

Because analysis may or may not be successful, it is subject to policies about whether the desired modification should be performed regardless of the success of the analysis. Regardless of whether or not a particular policy is applied, the executer 126 reports information about its analysis to the policy engine 128. Analysis results are logged for review and analysis by operators of the system. Policy application status is also reported for such review and analysis.

Where content modifications such as substitutions result in changes to the web content's implicit API, information about the substitution may be returned to the policy engine 128 to associate with a session or to be encoded directly into the modified content. Substitution information is used to translate subsequent requests. As noted further below, the information may be stored by the system or may be encrypted and provided to the requesting client computer, to be stored as a cookie or other component at that computer, and to be returned by the computer with any subsequent requests. The appropriateness of a particular specific strategy depends on the specific application of content modification.

Once a response is modified, the content renderer translates the system's internal representation of the modified content using the content re-encoders 148. Re-encoded modified content can then be transmitted to the client computer that made the request using the HTTP handler 126. Such operations may be repeated for each request/answer between a client computer and a web server system, and the modifications can be different each time, even when the same or substantially the same content is requested (e.g., the same page is served).

As a particular example of the processing of a request from a client computer, consider the HTTP POST in relation to FIGS. 1A to 1C. When a client computer posts data to a URL, with the data in the URL, the post request is forwarded by the load balancer 106 to the HTTP intermediary 102 for processing. This request is initially processed within the system 102 by the HTTP handler 126. The request is then evaluated by the policy engine 128. The policy engine 128 determines whether or not this request corresponds to content previously modified by the system 102, with the aid of the session handler 130. Post requests that do not correspond to a known session are passed through the system unmodified. If the post request corresponds to a session, any changes to the implicit API are translated back into their original values before being forwarded to the original webserver. Translation information is either stored by the system 102 itself or passed back to the system 102 from within the previously modified content. When the response to the original request is received from the original web server, the response is forwarded to the client computer through the load balancer 106. If session information is present and the translation information is invalid, the invalid request is logged.

The security intermediary 102 may include one or more computing devices that are separate from computing devices of the web server 104. In such implementations, the security intermediary 102 may communicate directly with the web server through a networking cable such as an Ethernet cable or fiber optic line (and typically through many such connections). The intermediary 102 can also communicate with the web server 104 through a network such as a local area network ("LAN"). In some instances, the intermediary 102 can be installed on the same premises as the web server 104 so that operators or administrators of the web server 104 can also maintain the intermediary 102 locally (particularly for large-volume applications). Installing the intermediary 102 in close proximity to the web server 104 can have one or more additional benefits including reduced transmission latency between the intermediary 102 and the web server 104 and increased security that stems from a private connection between the intermediary 102 and the web server 104 that is isolated from public networks such as the internet 110. This configuration can also avoid any need to encrypt communication between the intermediary 102 and the web server 104, which can be computationally expensive and slow.

In some implementations, the security intermediary 102 may include one or more computing devices that are separate from the computing devices of the web server 104, and that are connected to the web server 104 through a public network such as the internet 110. For example, a third-party security company may maintain one or more security intermediaries 102 on the security company's premises. The security company may offer services to protect websites and/or web servers 104 from exploitation according to the techniques described herein. The security intermediary 102 could then act as a reverse proxy for the web server 104, receiving outbound traffic from the web server 104 over the internet 110, processing the traffic, and forwarding the processed traffic to one or more requesting client computer 112. Likewise, the intermediary 102 may receive incoming traffic from client computer 112 over the internet 110, process the incoming traffic, and forward the processed traffic to the web server 104 over the internet 110. In this configuration, communication between the security intermediary 102 and the web server 104 may be encrypted and secured using protocols such as HTTPS to authenticate the communication and protect against interception or unauthorized listeners over the internet 110. In some embodiments, a private line or network may connect the web server 104 to the remote security intermediary 102, in which case the system 100 may use unencrypted protocols to communicate between the intermediary 102 and web server 104.

In some implementations, security intermediary 102 may be a virtual subsystem of web server 104. For example, the one or more computing devices that implement web server 104 may also include software and/or firmware for the security intermediary 102. The system 100 may include the security intermediary 102 as software that interfaces with, and/or is integrated with, software for the web server 104. For example, when the web server 104 receives a request over the internet 110, the software for the security intermediary 102 can first process the request and then submit the processed request to the web server 104 through an API for the web server 104 software. Similarly, when the web server 104 responds to a request, the response can be submitted to the security intermediary 102 software through an API for processing by security intermediary 102 before the response is transmitted over the internet 110.

In some configurations of the system 100, two or more security intermediaries 102 may serve the web server 104. Redundant security intermediaries 102 can be used to reduce the load on any individual intermediary 102 and to protect against failures in one or more security intermediaries. The system 100 can also balance traffic among two or more security intermediaries 102. For example, the system 100 may categorize traffic into shards that represent a logical portion of traffic to or from a website. Shards may be categorized according to client identity, network information, URL, the domain or host name in an HTTP request, identity of resources requested from the web server 104, location of resources requested from the web server 104, and/or the content of a request or the requested resource 104.

By this system then, content to be served by a web server system to a client computer (and to many thousands of client computers via many thousands of requests) can be altered and appended—altered to prevent malware from interacted with it in a malicious manner, and appended to provide instrumentation code that monitors the operation of the code on the client device and reports any abnormal actions so that a central system can analyze those actions to identify the presence of malware in a system. As described in more detail in FIG. 2, those operations can be used in combination with a number of other operations to both detect and deflect malicious activity directed at a web server system.

Figure 2:
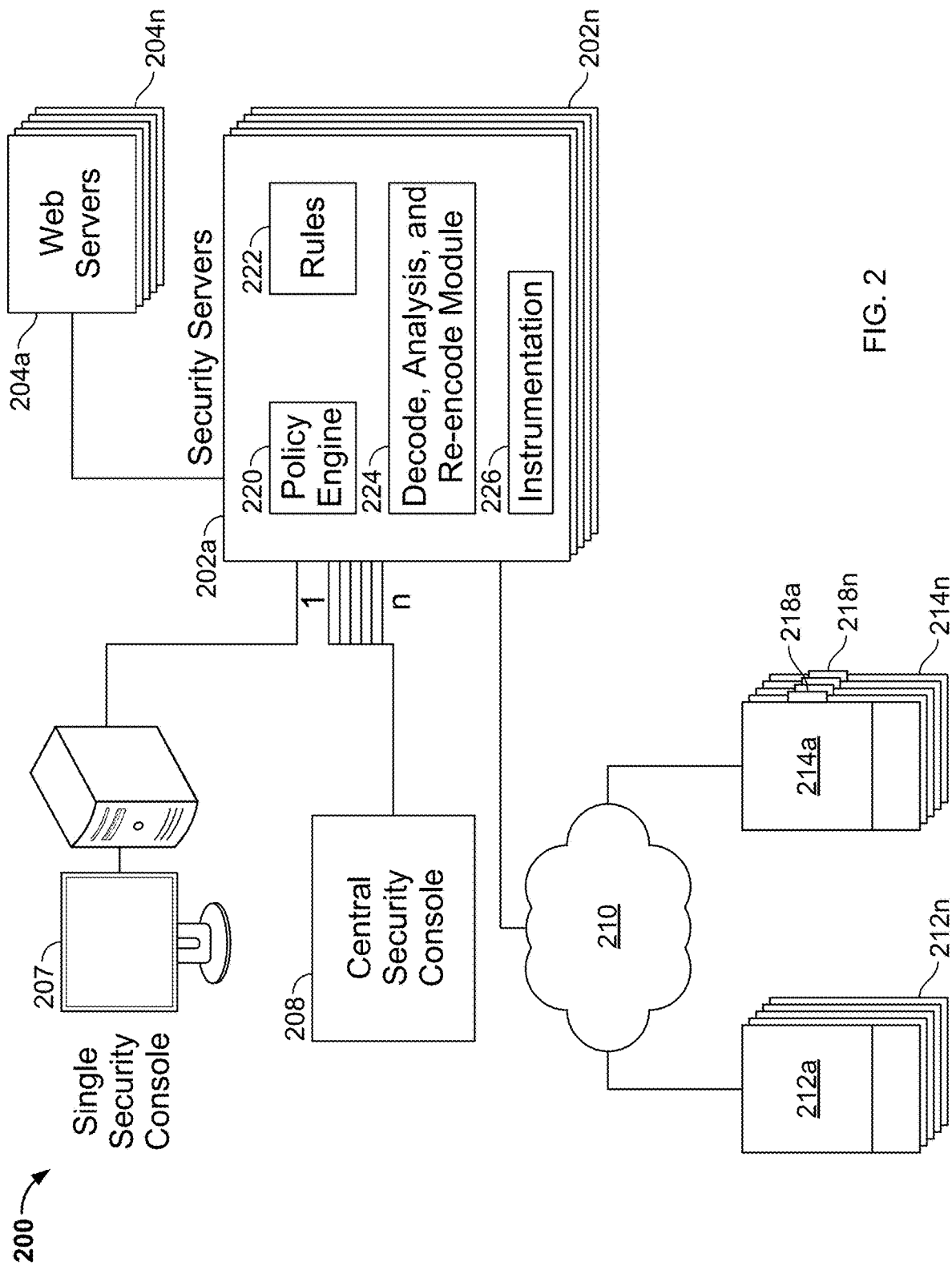
FIG. 2 is a schematic diagram of a system for performing deflection and detection of malicious activity with respect to a web server system.

FIG. 2 is a schematic diagram of a system 100 for performing deflection and detection of malicious activity with respect to a web server system. The system may be the same as the system 100 discussed with respect to FIGS. 1A and 1B, and is shown in this example to better explain the interrelationship of various features general features of the overall system 200, including the use of instrumentation code for detection and deflection that is discussed in greater detail throughout this document.

The system 200 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 204 *a*-204 *n*, and could include a broad array of web servers, content servers, database servers, financial servers, load balancers, and other necessary components (either as physical or virtual servers).

A set of security server systems 202 *a* to 202 *n* are shown connected between the web servers 204 *a* to 204 *n* and a network 210 such as the internet. Although both extend to n, the actual number of sub-systems could vary. For example, certain of the customers could install two separate security server systems to serve all of their web server systems (which could by one or more), such as for redundancy purposes. The particular security server systems 202 a-202 n may be matched to particular ones of the web server systems 204 a-204 n, or they may be at separate sites, and all of the web servers for various different customers may be provided with services by a single common set of security servers 202 a-202 n (e.g., when all of the server systems are at a single co-location facility so that bandwidth issues are minimized).

Each of the security server systems 202 a-202 n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determining naming that may extend across such different pieces of content (e.g., the name of a function or parameter), and such names may be changed in a way that differs each time the content is served, e.g., by replacing a named item with randomly—generated characters. Elements within the different types of content may first be group as having a common effect on the operation of the code, and then may be re-encoded together in a common manner so that their interoperation with each other will be consistent even after the re-encoding.

A rules engine 222 may store analytical rules for performing such analysis and for re-encoding of the content. The rules engine may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served, the generated name may be different. When the name of the parameter is passed back to the web server, it may be re-encoded back to its original name so that this portion of the security process may occur seamless for the web server.

A key for the function that encodes and decodes such strings can be maintained by the security server system 202 along with an identifier for the particular client computer so that the system 202 may know which key or function to apply, and may otherwise maintaining a state for the client computer and its session. A stateless approach may also be employed, whereby the security server system 202 encrypts the state and stores it in a cookie that is saved at the relevant client computer. The client computer may then pass that cookie data back when it passes the information that needs to be decoded back to its original status. With the cookie data, the system 202 may use a private key to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

An instrumentation module 226 is programmed to add active code to the content that is served from a web server. The instrumentation is code that is programmed to monitor the operation of other code that is served. For example, the instrumentation may be programmed to identify when certain methods are called, when those methods have been identified as likely to be called by malicious software. When such actions are observed by the instrumentation code to occur, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the OM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM that is easy to compare against corresponding representations of DOMs from other client computers. Other techniques may also be used by the instrumentation code to generate a compact representation of the DOM or other structure expected to be affected by malicious code in an identifiable manner.

Instrumentation code may also be used to gather information about the entity interacting with the content. This information may be helpful in distinguishing between human and non-human actors. For example, particular interactions or patterns of interaction with content on the client computers may be analyzed to determine whether the interactions are more likely the result of a legitimate user interaction with the content, a malicious or otherwise unwanted human interaction with the content from a remote user operating in the background, or a non-human actor such as an automated bot (malicious) or a browser plug-in (benign).

As noted, the content from web servers 204 a-204 n, as encoded by decode, analysis, and re-encode module 224, may be rendered on web browsers of various client computers. Uninfected clients computers 212 *a*-212 *n* represent computers that do not have malicious code programmed to interfere with a particular site a user visits or to otherwise perform malicious activity. Infected clients computers 214 *a*-214 *n* represent computers that do have malicious code (218 *a*-218 *n*, respectively) programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, implement DOMs for managing the displayed web pages, and instrumentation code may monitor the DOM as discussed above. Reports of illogical activity (e.g., software on the client device calling a method that does not exist in the downloaded and rendered content)

The reports from the instrumentation code may be analyzed and processed in various manners in order to determine how to respond to particular abnormal events, and to track down malicious code via analysis of multiple different similar interactions. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if must of the reported abnormal activity for its web site relates to content elements corresponding to money transfer operations—an indication that stale malicious code may be trying to access such elements surreptitiously.

A central security console may connect to a large number of web content providers, and may be run, for example, by an organization that provides the software for operating the security server systems 202 *a*-202 *n*. Such console 208 may access complex analytical and data analysis tools, such as tools that identify clustering of abnormal activities across thousands of client computers and sessions, so that an operator of the console 208 can focus on those cluster in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like. Such collected telemetry data, across many thousands of sessions, may be used by the console 208 to identify what is "natural" interaction with a particular page and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is running bad software.

Figure 3:
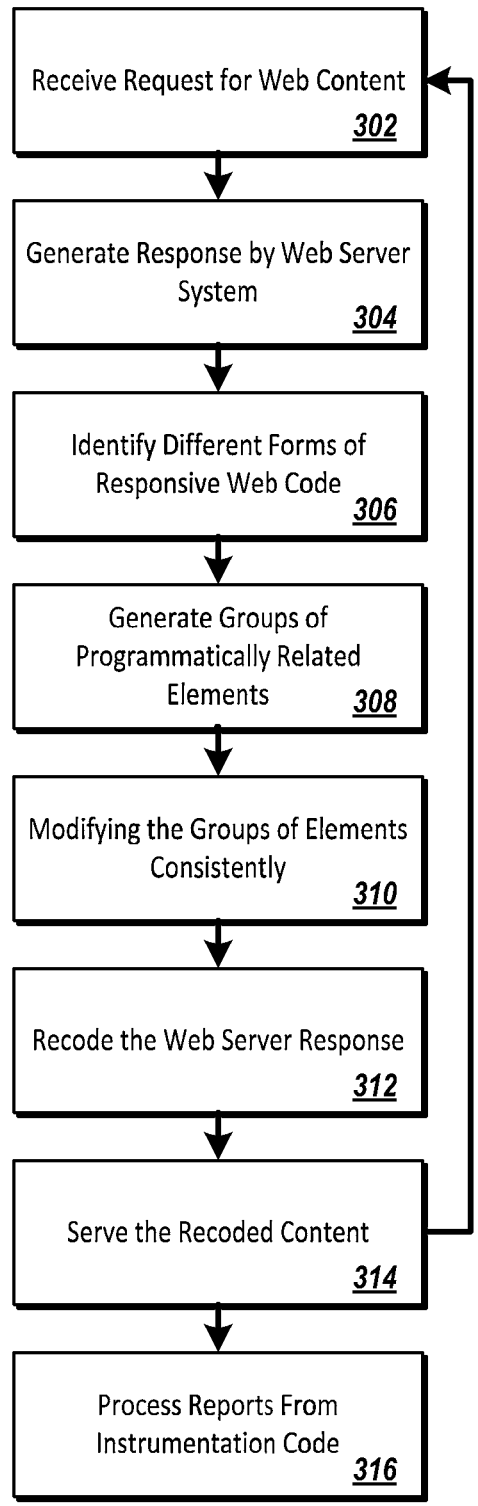
FIG. 3 is a flow chart of a process for serving modified and instrumented program code.

FIG. 3 is a flow diagram of a process for serving modified and instrumented program code. In general, the process involves identifying items in content to be served to a client computer that is programmatically related, and making changes to the items each time the content is served, so as to present a moving target to any bot or other malware that may be attempting to interact with the content in a malicious way.

The process begins at box 302, where a request for web content is received, such as from a client computer operated by an individual seeking to perform a banking transaction at a website for the individual's bank. The request may be in the form of an HTTP request and may be received by a load balancer operated by, or for, the bank. The load balancer may recognize the form of the request and understand that it is to be handled by a security system that the bank has installed to operate along with its web server system. The load balancer may thus provide the request to the security system, which may forward it to the web server system after analyzing the request (e.g., to open a tracking session based on the request), or may provide the request to the web server system and also provide information about the request to the security system in parallel.

At box 304, a response to the request is generated by the web server system. For example, the user may have requested to perform a funds transfer between accounts at the bank, where the funds are owned by the individual, and the response by the web server system may include HTML for a webpage on which the user can specify parameters for the transaction, along with JavaScript code and CSS code for carrying out such transactions at a web browser operated by the individual.

At box 306, the security server system identifies different forms of the responsive web code, such as the HTML and the associated CSS and JavaScript. The security server system may also identify connections between those code types, such as names of calls being made from one type of code to another, parameter names, and other similar items.

At box 308, the process generates groups from such programmatically related elements. For example, the process may flay portions of the code that was to be served, may copy portions of the code into a cash for further processing or may otherwise identify the programmatically related code across the different formats of code so that it can be analyzed and recoded.

At box 310, the process modifies the groups of elements in a consistent manner across the different types of code. For example, the security server system may be programmed to identify names of parameters, methods, or other items in the code, and to change those names consistently throughout the code so that, for example, calls to a particular method will be processed properly by that renamed method. Such renaming, as described above, may involve generating a random new name for content that will not be displayed to the user, where randomness is exhibited in making selections that thwart a malicious party from being able to predict what names will be used in any particular page load or session.

At box 312, the web server response is recoded by the security server system. For example, where random names are generated to replace original names served by the Web server system, the security server system may replace those names in the HTML, CSS, and or JavaScript. The process then serves the recoded content at box 314, in familiar manners. Such a process may be performed repeatedly each time a client computer requests content, with the recoded content being been different each time the content is served through the security server system, including when identical or nearly identical content is requested in separate transactions by two different users or by the same user.

In addition, the code that is served by the security system may be supplemented with instrumentation code that runs on the computer browser and monitors interaction with the web page. For example, the instrumentation code may look for particular method calls or other calls to be made, such as when the calls or actions relate to a field in a form that is deemed to be subject to malicious activity, such as a client ID number field, a transaction account number field, or a transaction amount field. When the instrumentation code observes such activity on the client device, it will report that activity along with metadata that helps to characterize the activity, and at box 314, the process receives such reports from the instrumentation code and processes them, such as by forwarding them to a central security system that may analyze them to determine whether such activity is benign or malicious.

For purposes of additional illustration, particular cases of transforming code for delivery through a security server system are illustrated.

Example 1

In the first example an original page is shown with human-recognizable labels of "democss," "demoinput1," demoinput2," and "blue":

```
<html>
  <head>
    <style>
    input[class = 'democss'] {
      background-color: blue;
      color: white;
    }
    input[name = 'demoinput1'] {
      background-color: red;
    }
     input[name = 'demoinput2'] {
       background-color: green;
    }
    a:link {color#FF0000;} /* unvisited link */
    a.blue:visited {color#FF00F0;}
    a:hover {color:#FF00FF;} /* mouse over link */
```

```
    a:active {color:#0000FF;} /* selected link */
    </style>
    <script type="text/javascript"">
    function displaytext(form) {
      var fn = form.demoinput1.value;
      var In = form['demoinput2'].value;
      x = window.document.getElementsByClassName("democss");
      cn = x[0].value;
      alert(fn + " : " + In + " class " + cn + "!");
    }
    </script>
  </head>
  <body>
    <h1>
This is a test page for Shape shifter.</h1>
    <a class="blue" href="http://www.example.com">
www.example.com</a>
<br/>
    <form name="myform">
      DemoInput1:<input name="demoinput1" size="20" type="text" value="Text1" />
      DemoInput2:<input name="demoinput2" size="20" type="text" value="Text2" />
      DemoCssClass:<input name="demo3" class ="democss" size="20" type="text" value="blue bgrnd white font" />
        <input name="button" onclick="displaytext(this.form)" type="button" value="Submit" />
      </form>
   </body>
   </html>
```

In the following transformed page, those labels have been replaced with randomly generated text, where the page will perform for a user in the same way as before the transformations. In this example, each of the input element (demoinput1, demoinput2) in the original page, will now have a set of input elements (introduced by Shape's safe-intelligent-content-modification engine) to confuse the bots. The Shape's client side library will determine which element dsjafhg897s or dssd8mfn77 pertinent to demoinput1 and the which element ksjfhg098 or dsfkjh9877 pertinent to demoinput2 will be marked for display. The CSS property will be chosen dynamically based on the rule set by safe-intelligent-content-modification engine.

```
<html>
  <head>
   <style>
   input[class = 'dfglkj2340958'] {
     background-color: blue;
     color: white;
   }
   input[name = 'dsjafhg897s'] {
     background-color: red;
   }
   input[name = 'ksjfhg098'] {
     background-color: green;
   }
   a:link {color#FF0000;} /* unvisited link */
   a.sdkjghf908:visited {color:#FF00F0;}
   a:hover {color:#FF00FF;} /* mouse over link */
   a:active {color:#0000FF;} /* selected link */
  </style>
    <script type="text/javascript">
    function shape_sdkjf193(form) {
      var fn = form.dsjafhg897s.value;
      var In = form['ksjfhg0981].value;
      x = window.document.getElementsByClassName("dfglkj2340958");
      cn = x[0].value;
      alert(fn + " : " + In + " class " + cn + "!");
    }
```

```
    </script>
  </head>
  <body>
    <h1>
This is a test page for Shape shifter.</h1>
    <a class="sdkjghf908" href="http://www.example.com">
www.example.com</a>
<br/>
    <form name="myform">
      DemoInput1:<input name="dsjafhg897s" size="20" type="text" value="Text1"
/>
      DemoInput2:<input name="ksjfhg098" size="20" type="text" value="Text2"
/>
      DemoCssClass:<input name="demo3" class ="dfglkj2340958" size="20"
type="text" value="blue bgrnd white font" />
        <input name="button" onclick="shape_sdkjf193(this.form)" type="button"
value="Submit" />
      </form>
    </body>
    </html>
```

Example 2

In this example, the process transforms the form elements, Javascript, and CSS to ensure the generated forms are sufficiently random. But even before it completes the transformation, it will checks to determine if there is some kind of name-collision to ensure the page is not broken. The original code:

```
<html>
  <head>
    <style>
      input[class = 'dfglkj2340958'] {
        background-color: blue;
        color: white;
      }
      input[name = 'dsjafhg897s'] {
        background-color: red;
      }
      input[name = 'ksjfhg098'] {
        background-color: green;
      }
      a:link {color:#FF0000;}  /* unvisited link */
      a.sdkjghf908:visited{color:#FF00F0;}
      a:hover {color:#FF00FF;}  /* mouse over link */
      a:active {color:#0000FF;}  /* selected link */
    </style>
    <script type="text/javascript">
      function shape_sdkjf193(form) {
        var d1 = form.dsjafhg897s.value;
        var d2 = form['ksjfhg098'].value;
        x = window.document.getElementsByClassName("dfglkj2340958");
        c1 = x[0].value;
        alert(d1 + " : " + d2 + " class " + c1 + "!");
      }
    </script>
  </head>
  <body>
  <script>
  document.sessid = "dfglkj2340958";
  </script>
    <h1>
This is a test page for Shape shifter.</h1>
    <a class="sdkjghf908" href="http://www.example.com">
www.example.com</a>
<br/>
    <form name="myform">
      DemoInput1:<input name="dsjafhg897s" size="20" type="text" value="Text1"
/>
      <input type="hidden" name=" dsjafhg897s" value="1" />
      DemoInput2:<input name="ksjfhg098" size="20" type="text" value="Text2"
/>
      <input type="hidden" name=" ksjfhg098" value="1" />
      <input type="hidden" name=" sessid" value="dfglkj2340958" />
```

```
    DemoCssClass:<input name="demo3" class ="dfglkj2340958" size="20"
type="text" value="blue bgrnd white font" />
      <input name="button" onclick="shape_sdkjf193(this.form)" type="button"
value="Submit" />
    </form>
  </body>
</html>
```

In the above example, the security server system will detect that some origin generated content collides with a subset of SICM's transformation(s). In such case, SICM algorithm will regenerate the value to avoid collision before sending the bits to the visitor webpage. The regenerated code without the collision:

```
<html>
  <head>
    <style>
    input[class = ' ydkjkzf908'] {
      background-color: blue;
      color: white;
    }
    input[name = 'dsjafhg897s'] {
      background-color: red;
    }
    input[name = 'ksjfhg098'] {
      background-color: green;
    }
    a:link {color:#FF0000;} /* unvisited link */
    a.sdkjghf908:visited{color:#FF00F0;}
    a:hover {color:#FF00FF;} /* mouse over link */
    a:active {color:#0000FF;} /* selected link */
    </style>
    <script type="text/javascript">
    function shape_sdkjf193(form) {
      var d1 = form.dsjafhg897s.value;
      var d2 = form['ksjfhg098'].value;
      x = window.document.getElementsByClassName("ydkjkzf908");
      c1 = x[0].value;
      alert(d1 + " : " + d2 + " class " + c1 + "!");
    }
    </script>
  </head>
  <body>
  <script>
  document.sessid = "dfglkj2340958";
  </script>
  <h1>
This is a test page for Shape shifter.</h1>
   <a class="ydkjkzf908" href="http://www.example.com">
www.example.com</a>
  <br/>
   <form name="myform">
    DemoInput1:<input name="dsjafhg897s" size="20" type="text" value="Text1"
/>
     <input type="hidden" name=" dsjafhg897s" value="1" />
    DemoInput2:<input name="ksjfhg098" size="20" type="text" value="Text2"
/>
     <input type="hidden" name=" ksjfhg098" value="1" />
     <input type="hidden" name=" sessid" value="dfglkj2340958" />
    DemoCssClass:<input name="demo3" class ="dfglkj2340958" size="20"
type="text"
value="blue bgrnd white font" />
      <input name="button" onclick="shape_sdkjf193(this.form)" type="button"
value="Submit"/>
    </form>
  </body>
</html>
```

Example 3

When the security server system content is not safely modifiable, the system marks the page as not modifiable and passes the form without breaking the functionality/style of the original website. The security server system can determine that content is not safely modifiable according to policies that indicate complexity limits for modifications. If, for a given policy, the system determines that content is too complex for safe modification and thus exceeds the policy's complexity limits, then the security server system will mark the page as not modifiable and pass the form without breaking the functionality/style of the original website. An original page:

```
<!DOCTYPE html>
<html>
<head>
<script>
function nthFibonacci(n) {
  var f3 = 0;
  for (i = 0;
  i < n;
  i++) {
    f3 = document.f1 + document.f2;
    document.f1 = document.f2;
    document.f2 = f3;
  }
  return f3;
}
function createUsrNameAndPassword( ) {
  usrnameVal = nthFibonacci(document.sessid);
  usrpasswordVal = nthFibonacci(document.sessid - 1);
  usrname = "Username" + usrnameVal;
  usrpasswd = "Password" + usrpasswordVal;
  console.log("Usr = " + usrnameVal + " passwd = " + usrpasswordVal);
  var txtusr =document.createTextNode(usrname);
  var txtpwd =document.createTextNode(usrpasswd);
  var inputelemusr = document.createElement("input");
  inputelemusr.name = usrname;
  inputelemusr.type = "text";
  inputelemusr.size = "20";
  inputelemusr.value = "User name";
  document.getElementById("demo").appendChild(inputelemusr);
  var inputelempasswd = document.createElement("input");
  inputelempasswd.name = usrpasswd;
  inputelempasswd.type = "password";
  inputelempasswd.size = "20";
  inputelempasswd.value = "User name";
  document.getElementById("demo").appendChild(inputelempasswd);
  var submit = document.createElement("input");
  submit.name = "Submit";
  submit.type = "button";
  submit.size="20";
  submit.value="Submit";
  document.getElementById("demo").appendChild(submit);
  var inputhiddenelem = document.createElement("input");
  inputhiddenelem.name = "sessid";
  inputhiddenelem.type = "hidden";
  inputhiddenelem.value = document.sessid;
  document.getElementById("demo").appendChild(inputhiddenelem);
}
</script>
</head>
<body>
<script>
document.f1 = 0;
document.f2 = 1;
document.sessid = 20;
</script>
<p>
Click the button to calculate x.</p>
<input onclick="createUsrNameAndPassword( )" type="button" value="Show Form" />
<form id="demo" action="post">
</form>
</body>
</html>
```

The origin website creates a unique session ID and the form elements are generated by appending a Fibonacci number to username and password. The regenerated code:

```
<html>
<head>
<script>
function nthFibonacci(n) {
  var f3 = 0;
  for (i = 0;
  i < n;
  i++) {
    f3 = document.f1 + document.f2;
    document.f1 = document.f2;
    document.f2 = f3;
  }
  return f3;
}
function createUsrNameAndPassword( ) {
  usrnameVal = nthFibonacci(document.sessid);
  usrpasswordVal = nthFibonacci(document.sessid - 1);
  usrname = "Username" + usrnameVal;
  usrpasswd = "Password" + usrpasswordVal;
  console.log("Usr = " + usrnameVal + " passwd = " + usrpasswordVal);
  var txtusr =document.createTextNode(usrname);
  var txtpwd =document.createTextNode(usrpasswd);
  var inputelemusr = document.createElement("input");
  inputelemusr.name = usrname;
  inputelemusr.type = "text";
  inputelemusr.size = "20";
  inputelemusr.value = "User name";
  document.getElementById("demo").appendChild(inputelemusr);
  var inputelempasswd = document.createElement("input");
  inputelempasswd.name = usrpasswd;
  inputelempasswd.type = "password";
  inputelempasswd.size = "20";
  inputelempasswd.value = "User name";
  document.getElementById("demo").appendChild(inputelempasswd);
  var submit = document.createElement("input");
  submit.name = "Submit";
  submit.type = "button";
  submit.size="20";
  submit.value="Submit";
  document.getElementById("demo").appendChild(submit);
  var inputhiddenelem = document.createElement("input");
  inputhiddenelem.name = "sessid";
  inputhiddenelem.type = "hidden";
  inputhiddenelem.value = document.sessid;
  document.getElementById("demo").appendChild(inputhiddenelem);
}
</script>
</head>
<body>
<script>
document.f1 = 0;
document.f2 = 1;
document.sessid = 20;
//Set by origin website </script>
<p>
Click the button to calculate x.</p>
<input onclick="createUsrNameAndPassword( )" type="button" value="Show Form">
<form id="demo" action="post">
<input name="Username10946" type="text" size="20">
<input name="Password102334155" type="password" size="20">
<input name="Submit" type="button" size="20" value="Submit">
<input name="sessid" type="hidden" value="20">
</form>
</body>
</html>
```

Figure 4:
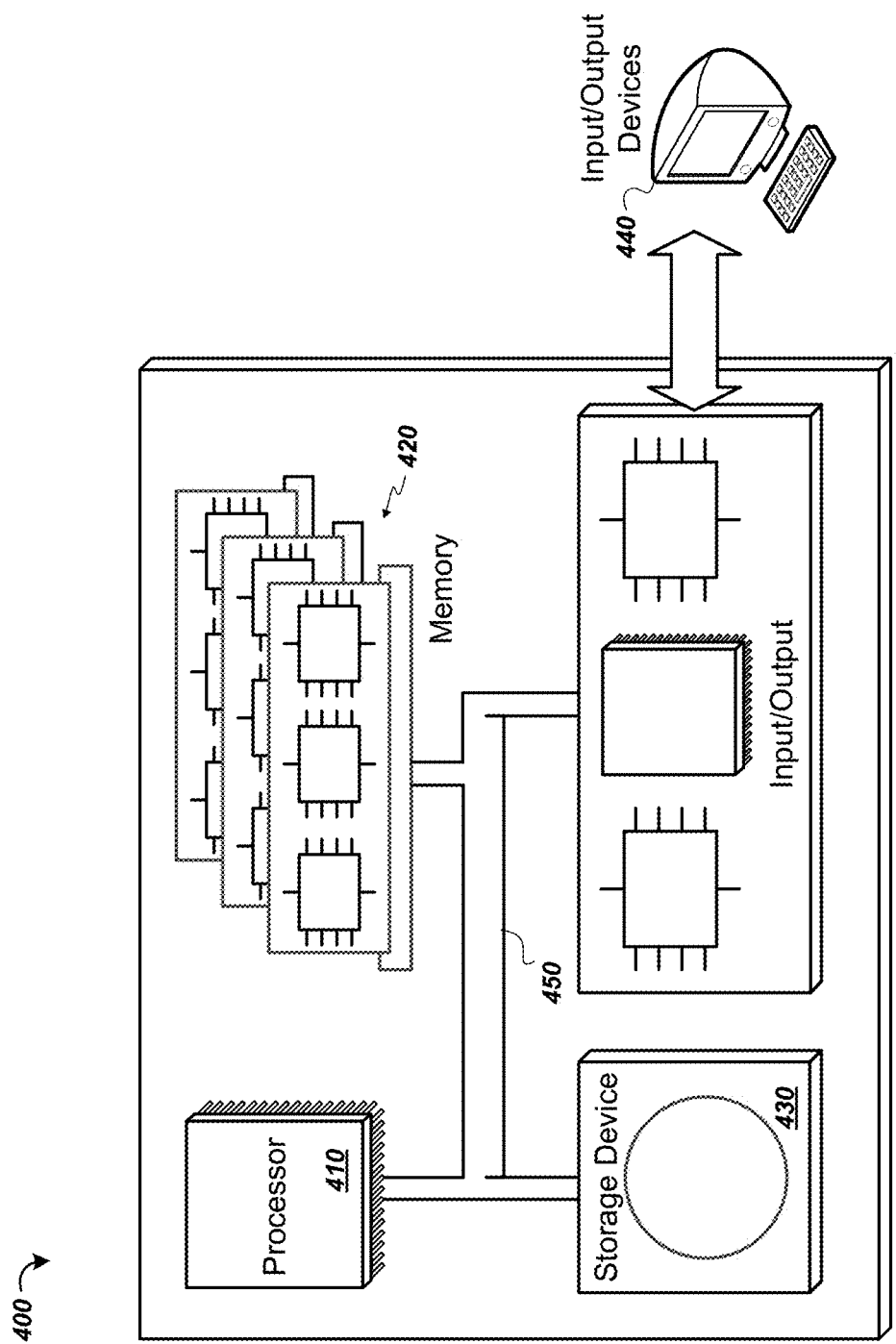
FIG. 4 is a schematic diagram of a general computing system.

FIG. 4 is a schematic diagram of a general computing system 400. The system 500 can be used for the operations described in association with any of the computer-implement methods described previously, according to one implementation. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor;

and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files;

such devices include magnetic disks, such as internal hard disks and removable disks;

magneto-optical disks;

and optical disks. Storage devices suitable for tangibly embodying computer program instructions and data include all forms of non-volatile memory, including by way of example semiconductor memory devices, such as EPROM, EEPROM, and flash memory devices;

magnetic disks such as internal hard disks and removable disks;

magneto-optical disks;

and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In some implementations, the subject matter may be embodied as methods, systems, devices, and/or as an article or computer program product. The article or computer program product may comprise one or more computer-readable media or computer-readable storage devices, which may be tangible and non-transitory, that include instructions that may be executable by one or more machines such as computer processors.

What is claimed is:

1. A non-transitory computer readable medium having stored thereon instructions comprising executable code which when executed by one or more processors, causes the processors to:
    obtain web code corresponding to content to be served to a first client device in response to a first request from the first client device;
    generate modified web code based on the web code by changing a particular programmatic element to a modified programmatic element throughout the web code;
    generate instrumentation code configured to monitor and report on one or more interactions with versions of the particular programmatic element when the modified web code executes on the first client device;
    cause the instrumentation code to be provided in association with the modified web code to the first client device in response to the first request from the first client device;
    receive report data generated by the instrumentation code, the report data describing abnormal activity at the first client device, the abnormal activity comprising an interaction with a version of the particular programmatic element that does not exist in the modified web code; and
    determine, based on the report, that the first client device is likely controlled by malware.

2. The non-transitory computer readable medium of claim 1, wherein the instructions further comprise executable code which when executed by one or more processors, causes the processors to:
    add the instrumentation code to the modified web code.

3. The non-transitory computer readable medium of claim 1, wherein the instructions further comprise executable code which when executed by one or more processors, causes the processors to:
    receive a second request from the first client device corresponding to the interaction with the version of the particular programmatic element, wherein the second request includes the report data.

4. The non-transitory computer readable medium of claim 1, wherein the particular programmatic element is a function name and the modified programmatic element is a second function name that includes a randomized string of characters.

5. The non-transitory computer readable medium of claim 1, wherein the instrumentation code monitors and reports on a function call that does not match function calls that are permissible for the modified web code.

6. The non-transitory computer readable medium of claim 1, wherein modification made to the particular programmatic element differs from modifications made in response to one or more other client devices requesting the content comprising the first web code.

7. The non-transitory computer readable medium of claim 1, wherein the particular programmatic element is a function name for a function that makes changes to a document object model (DOM) corresponding to the content.

8. The non-transitory computer readable medium of claim 1, wherein the report data describes a call to a method and metadata that characterizes the call.

9. The non-transitory computer readable medium of claim 8, wherein determining that the first client device is likely controlled by malware comprises and using the metadata to determine whether the abnormal activity is malicious or benign.

10. The non-transitory computer readable medium of claim 8, wherein the metadata includes information about an entity making the call at the first client device.

11. A management system, comprising one or more client devices or server devices, the system comprising memory comprising programmed instructions stored thereon and one or more processors configured to be capable of executing the stored programmed instructions to:
    obtain web code corresponding to content to be served to a first client device in response to a first request from the first client device;
    generate modified web code based on the web code by changing a particular programmatic element to a modified programmatic element throughout the web code;
    generate instrumentation code configured to monitor and report on one or more interactions with versions of the particular programmatic element when the modified web code executes on the first client device;
    cause the instrumentation code to be provided in association with the modified web code to the first client device in response to the first request from the first client device;
    receive report data generated by the instrumentation code, the report data describing abnormal activity at the first client device, the abnormal activity comprising an interaction with a version of the particular programmatic element that does not exist in the modified web code; and
    determine, based on the report, that the first client device is likely controlled by malware.

12. The system of claim 11, wherein the one or more instructions, when executed by the one or more hardware processors, cause the one or more hardware processors to:
    add the instrumentation code to the modified web code.

13. The system of claim 11, wherein the one or more instructions, when executed by the one or more hardware processors, cause the one or more hardware processors to:
    receive a second request from the first client device corresponding to the interaction with the version of the particular programmatic element, wherein the second request includes the report data.

14. The system of claim 11, wherein the particular programmatic element is a function name and the modified programmatic element is a second function name that includes a randomized string of characters.

15. The system of claim 11, wherein the instrumentation code monitors and reports on a function call that does not match function calls that are permissible for the modified web code.

16. The system of claim 11, wherein modification made to the particular programmatic element differs from modifications made in response to one or more other client devices requesting the content comprising the first web code.

17. The system of claim 11, wherein the particular programmatic element is a function name for a function that makes changes to a document object model (DOM) corresponding to the content.

18. The system of claim 11, wherein the report data describes a call to a method and metadata that characterizes the call.

19. The system of claim 18, wherein determining that the first client device is likely controlled by malware comprises and using the metadata to determine whether the abnormal activity is malicious or benign.

20. The system of claim 18, wherein the metadata includes information about an entity making the call at the first client device.

* * * * *